July 17, 1934.    G. H. WALKER    1,966,603
APPARATUS FOR TESTING MOTOR VEHICLES
Filed Jan. 14, 1932    3 Sheets-Sheet 1
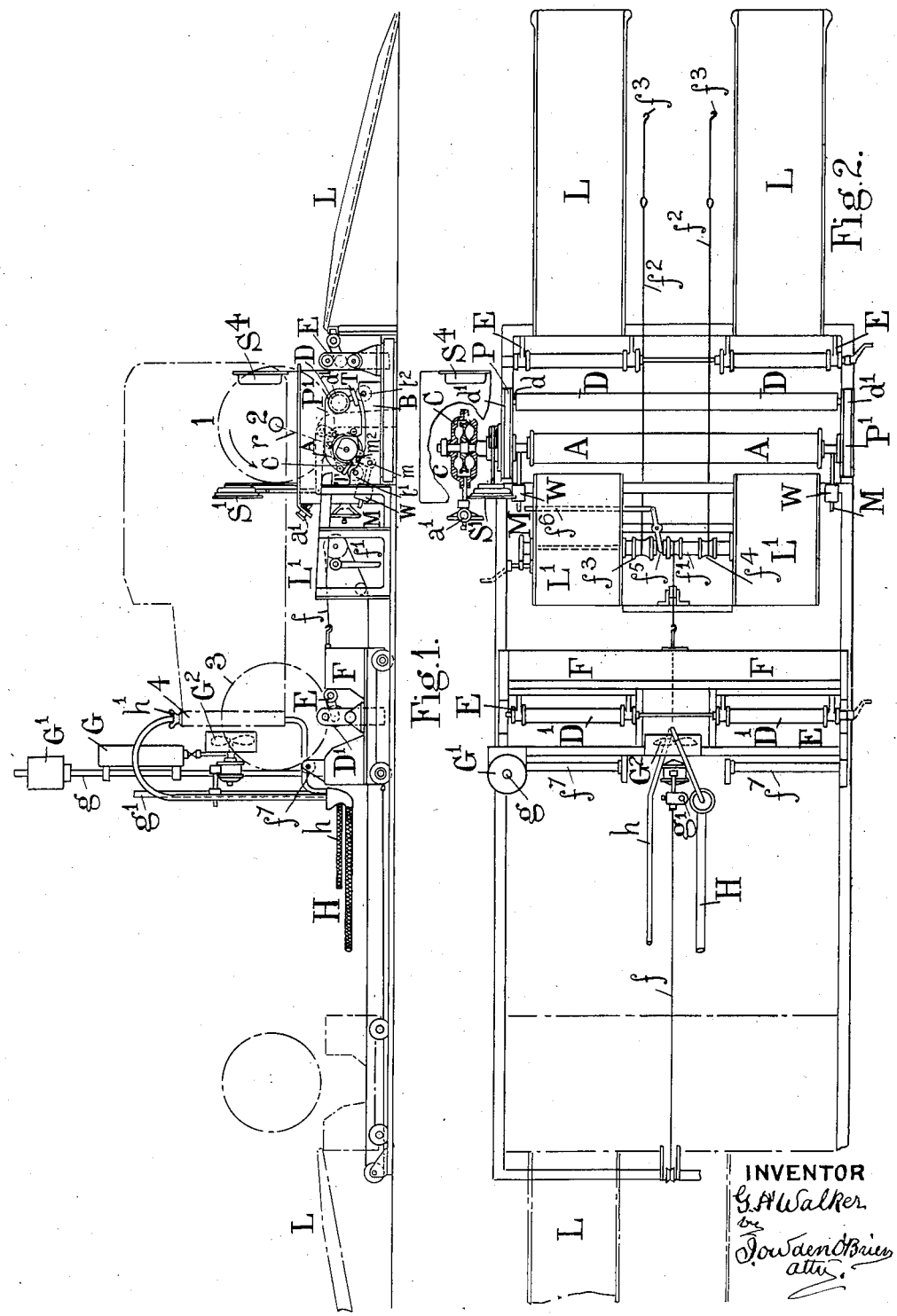
INVENTOR
G. H. Walker July 17, 1934.  G. H. WALKER  1,966,603
APPARATUS FOR TESTING MOTOR VEHICLES
Filed Jan. 14, 1932  3 Sheets-Sheet 2
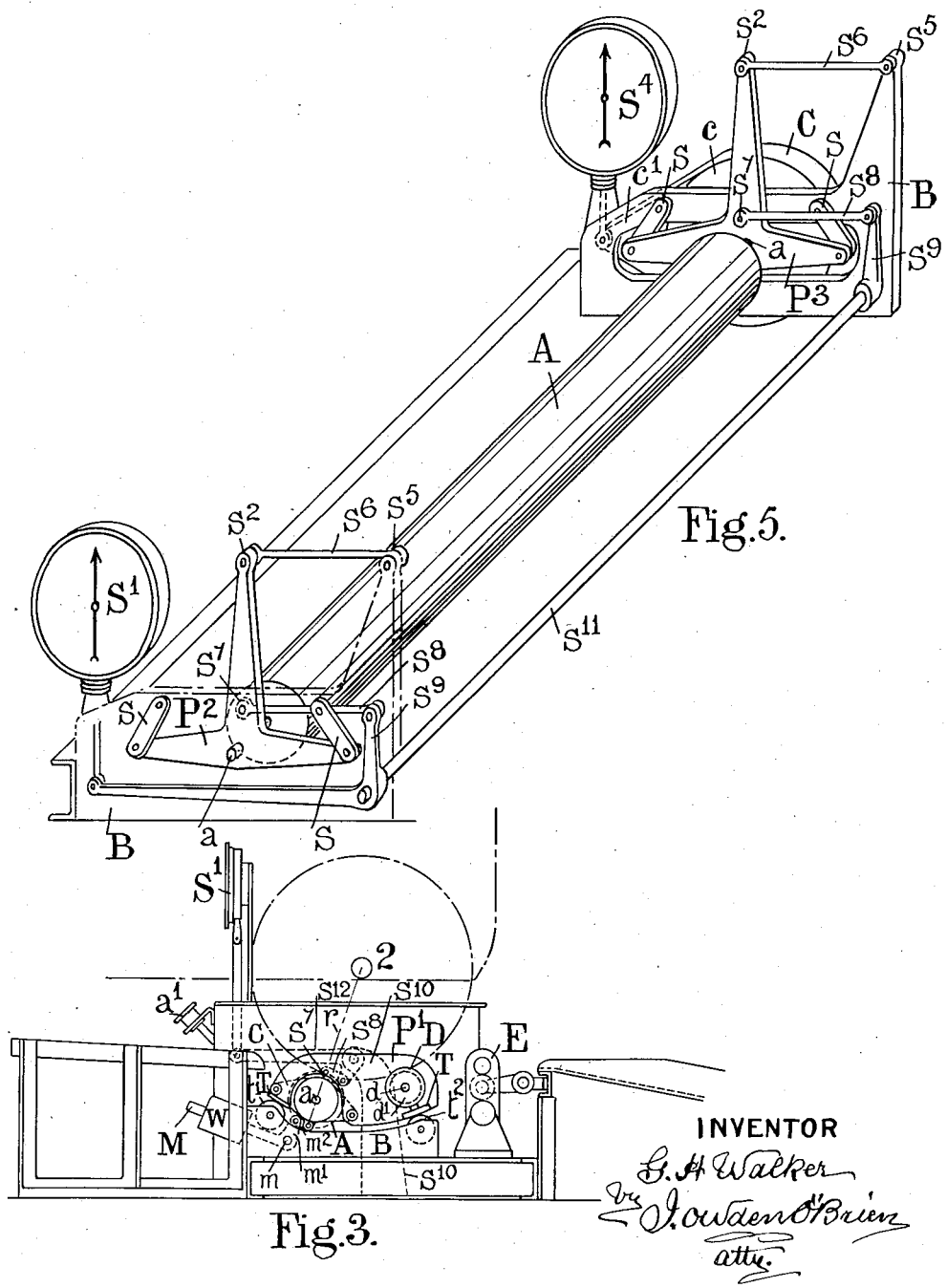

July 17, 1934.　　　G. H. WALKER　　　1,966,603
APPARATUS FOR TESTING MOTOR VEHICLES
Filed Jan. 14, 1932　　　3 Sheets-Sheet 3

INVENTOR
G. H. Walker

Patented July 17, 1934

1,966,603

UNITED STATES PATENT OFFICE 1,966,603

APPARATUS FOR TESTING MOTOR VEHICLES

George Henry Walker, Worcester, England, assignor to Heenan & Froude Limited, Worcester, England Application January 14, 1932, Serial No. 586,552
In Great Britain February 21, 1931

5 Claims. (Cl. 265—24)

This invention relates to improvements in apparatus for testing self propelled vehicles such apparatus being of the type having a drum or drums upon which the vehicle wheels are mounted and a brake or dynamometer for applying a measured braking force to oppose the rotation of the drum or drums.

According to the present invention the drum or drums upon which the driving wheels are mounted are carried on cradles capable of movement concentrically about a point coinciding with the axis of the wheels of the vehicle.

A further feature of the invention is that the brake or dynamometer is mounted on the cradles supporting the drums carrying the driving wheels in order that it may have freedom of movement concentrically about an axis coinciding with the axis of the driving wheels.

In the following description of the drawings illustrating different ways in which the invention may be carried out the different devices are constructed for testing vehicles having their front and rear wheels fitted with brakes and in which the power of the engine is delivered through the transmission gearing to the rear wheels of the vehicle. For vehicles which do not conform to this usual standard such as those having front wheel drive or having a brake on the transmission shaft suitable modifications would be necessary to adapt the apparatus to such altered conditions.

In these drawings:—

Fig. 1 is a side elevation of one form of the testing device.

Fig. 2 is a plan view of Fig. 1.

Fig. 3 is an enlarged detail view showing one form of cradle.

Fig. 5 is a perspective view of a modified arrangement.

Figure 4:
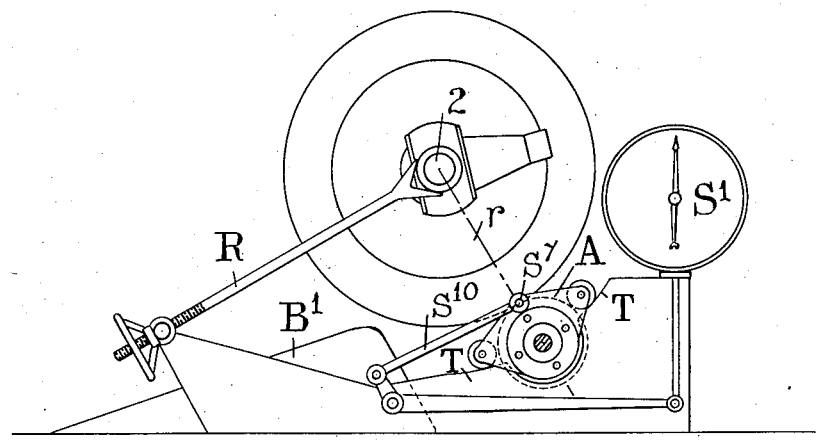
Fig. 4 is a side elevation of a variation of the arrangement shown in Fig. 1.

The drum A and shaft $a$ are carried by two cradles P P1 having freedom of movement concentrically about the axis passing through the centres of the driving wheels. A stationary under carriage B at each end of the shaft $a$ is fitted with rollers $t^1$, $t^2$ supporting the weight of each cradle and working in a track T on the cradle, the contour of which is formed by striking a radius $r$ from the centre of the axle 2 of the vehicle. The brake or dynamometer C is attached rigidly to one cradle P and its rotor is connected directly or through gearing with the drum shaft $a$.

A drum D is arranged behind the drum A so that the wheel of the vehicle is supported between the drum A and the drum D. The drum D is mounted on shafts $d$ supported by bearings $d^1$ on the cradles P, P1 and a device E for indicating the efficiency of the vehicle brake mounted on the under carriage behind the cradle the vehicle wheels being supported on the device E for this purpose. Any desired mechanism for this purpose may be employed but the preferred form thereof is that described in the prior U. S. Patent No. 1,879,721 dated September 27, 1932 and a device E of this type is indicated on the drawings.

The shaft of the drum A is connected as above stated either directly or through gearing to a dynamometer C capable of absorbing and measuring the power reaching the drum. The dynamometer C is carried on the cradle P in order that it may move with the cradles P, P1 and drum A when in operation. The dynamometer readings are shown on a dial S4 of a weighing machine attached thereto and this weighing machine is graduated to give direct readings of the tractive effort exerted by the rear wheels of the vehicle upon the drum and the effective length of the lever arm is constructed accordingly.

In order to avoid the necessity of accurate setting up of the vehicle wheels on the drum before a test it has been found desirable to balance or neutralize the weight of the drum A, the supporting cradles P, P1 and the dynamometer C whereupon the cradle assembly will accommodate itself to any position of the wheel axle without affecting the reading on the dials of a weighing machine S1 which registers the reactions due both to rolling resistance between tyres and drum and to torque reaction of the dynamometer casing, i. e. the effective tractive effort or B. H. P. developed by the wheels.

In the arrangement shown in Fig. 3 the weight of the cradles P, P1 and dynamometer C is compensated by a lever M carrying a balance weight W, and cross shaft $m$ having short arms $m^1$ which are connected through links $m^2$ to any convenient part of the cradles P and P1. The shaft $m$ is supported in anti-friction bearings and the short arms $m^1$ which are attached to it are connected respectively one to each cradle.

At a point $s^7$ corresponding with the point of contact between the tyres of the driving wheels of the vehicle and the drum A, the cradle P1 is connected by a link $s^8$ to a bell crank lever $s^{12}$ pivoted to a bracket $s^{10}$ carried by the under-frame B. The bell crank lever $s^{12}$ forms the short and long arm of a lever weighing machine S1 fitted with steelyard type weighing apparatus or preferably to a spring balance in the manner already described.

It can be shown that with very close accuracy the B. H. P. delivered to the drum is equal to—

$$\frac{\text{Tractive effort in lbs.} \times \text{speed in miles per hour}}{375.}$$

If the speed is fixed for example at 10 M. P. H. the B. H. P. is then given by the formula—

$$\frac{\text{Tractive effort in lbs.}}{37.5}$$

If then the scale showing the tractive effort be replaced or supplemented by another reading "B. H. P. at 10 M. P. H." the graduation corresponding with 37.5 lbs. on the original scale becomes equivalent to 1 B. H. P. that corresponding with 75 lbs. becomes 2 B. H. P. and so on. Therefore by marking the dial with a series of graduations, this dial is caused to indicate direct readings of B. H. P. at 10, 20, 30, 40 and so on M. P. H. and graduations may be added showing fractional values of B. H. P. Again, similar scales may be prepared showing the values of B. H. P., speed and tractive effort in metric or other units of measurements.

In order to show the equivalent road speed of the vehicle I arrange to drive a speedometer $a^1$ by gearing or otherwise from the drum shaft $a$ and arrange the graduation of the dial, gear ratio, and diameter of the drum to enable the speedometer to give a direct reading in miles or kilometres per hour of the peripheral velocity of the drum. The speedometer $a^1$ may be of any suitable mechanical or electrical type.

By supporting the drum shaft bearings at each end in cradles and carrying a brake or dynamometer on the cradles, two separate measurements of power are simultaneously obtainable. One indicates the total tractive effort including that due to overcoming tyre losses, and the other indicates the net power reaching the drum shaft after deduction of tyre losses.

Fig. 4 shows a detail view of a slight modification of the arrangement shown in Fig. 1 in which the rear wheels of the vehicle are mounted on the drum A and held thereon by an adjustable stop R. The tractive effort is measured by links $s^{10}$ connected at one end to the weighing machine $S^1$ and at the other to a point on one cradle coinciding with the point $s^7$ of contact between tyre and drum.

On setting a vehicle in position with the driving wheels resting upon the drum, the rear axle of the vehicle tends to run backwards against the adjustable stop R having means by which the position of the driving axle 2 may be adjusted so as to lie upon the radius line $r$ of the track T passing through the centre of the vehicle shaft 2. Ramps B1 may be utilized for assistance in running the vehicle into the testing position.

As shown in Fig. 5 one cradle $P^2$ is suspended on links $s$ pivoted to the underframe B and is attached by a link $s^8$ and a bell crank lever $s^9$ to the short arm of the weighing machine or spring balance $S^1$ or other convenient device.

The drum shaft $a$ is coupled to the rotating member of a dynamometer C, the non-rotating stator $c$ of which is carried by trunnion bearings upon the second cradle $P^3$ similar to the cradle $P^2$. The stator $c$ is free to swivel upon the trunnions but is prevented from doing so by means of an arm $c^1$ attached to the further weighing machine $S^4$ which is capable of measuring the power absorbed by the dynamometer, the whole of which is supplied by the drum shaft $a$. When power is applied through the tyres of the vehicle to the drum, the rotation of which is resisted by a brake or by the dynamometer C, the drum tends to move bodily away from the tyre in a direction tangential to the wheel of the vehicle. In order to prevent this happening, the drum is carried upon the shaft $a$ having bearings contained in the cradles. These bearings receive from the shaft a force equal or proportionate to the tractive effort exerted by the wheel of the vehicle, and transfer it to the cradles. Although the shaft $a$ may be revolving, it simultaneously exerts a pull or force in a direction tangential to the wheel of the vehicle and in the arrangement shown by Fig. 5 tends to pull the cradles in the same direction. Thus the pull of the second weighing machine $S^4$ is in a direction substantially normal to the pull exerted by the drum shaft $a$ and does not therefore affect the accuracy of the weighing device $S^1$.

The weighing machine $S^1$ registers the total tractive effort needed to overcome tyre losses and the machine $S^4$ the net power reaching the drum shaft after deduction of tyre losses.

The cradles $P^2$, $P^3$ supporting the drum shaft and dynamometer trunnions, have converging arms which if extended would meet the axis of the driving wheels at a point $s^2$, a link $s^6$ being connected to a fixed anchorage at $s^5$ whereby the point $s^2$ becomes the virtual centre of oscillation of the cradles $P^2$, $P^3$. At another point $s^7$ coinciding with the point of contact between tyre and drum, a further link $s^8$ connects the arm of the cradle through levers $s^9$ with the weighing machine $S^1$. By this means the link $s^8$ is caused to transmit a force which is equal to the tractive effort exerted by the driving wheels of the vehicle including that portion which is utilized in overcoming rolling resistance between tyres and drum.

In this arrangement cross-winding of cradles due to inequalities of loads is prevented by keying both lever arms $s^9$ to a common shaft $s^{11}$.

Figure 6:
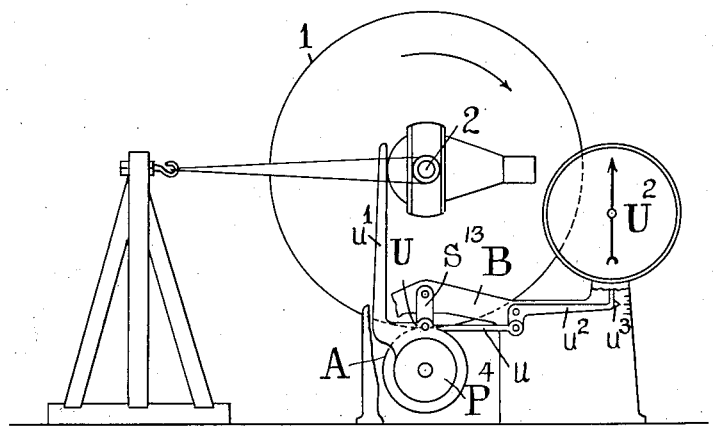
Fig. 6 is a side elevation of a further modification.

In Fig. 6 is shown diagrammatically a chassis dynamometer in which the drum A is carried by the cradles $P^4$, $P^5$ each of which is itself suspended from the underframe B by links $s^{13}$. An arm $u^1$ extending upwards from the cradles $P^4$, bears against the back of the axle casing and retaining ropes or arms are provided to prevent movement in a forward direction.

The point of contact of the arm $u^1$ with the axle casing is regarded as one fulcrum around which the cradle and arm tend to rotate. The arm $u^1$ should theoretically be applied to the wheel axle at the point 2 but in practice it is found that the accuracy of the result is not materially affected by applying it to the axle casing. It has been ascertained that measurements of axle horse power by observation of the drawbar pull on anchoring ropes are inaccurate due to a rearward reaction of the tyre thereby preventing the full force from taking effect upon the draw bar. This rearward force is transmitted by the arm $u^1$ to the cradles.

The vehicle is so mounted on the drum A that before the wheels 1 are set in motion the centre of the wheels 1, the centre of the drum A, the point of connection of one end of the links $s^{13}$ to the underframe B and the points of connection U of the other ends to the cradles $P^4$, all lie in the same vertical plane.

The weight of the drum and the supported wheel being carried by the links s both the point U and the centre of the drum A are free to rotate about the axis of the wheels. The point of connection U of the link $s^{13}$ to the cradle $P^4$ is connected by a link $u$ and bell crank lever $u^2$ to a weighing machine $U^2$, an indicator pointer $u^3$ being provided on the bell crank lever $u^2$ to show when this latter is in a horizontal position. The cradle thus tends to rotate also about the fulcrum formed by the pivot of the link $s^{13}$ and underframe B. Rotation of the drum is resisted by a suitable brake either hydraulic, friction or electric (not shown) the stator of which is bolted to the cradle and the resultant force due to this braking of the drum and the rearward reaction transmitted by the arm $u^1$ causes the point U to move in the direction of the arrow when the wheel is rotating in the direction shown, this movement being transmitted to and registered on the weighing machine $U^2$ and represents the power developed by the wheels.

For testing the efficiency of the brakes of the front wheels 3, drums $D^1$ to support the wheels and brake testing apparatus E of any desired type but preferably of the type above referred to and described in U. S. specification No. 1,879,721 are carried by a trolley F the position of which can be adjusted to suit the wheel base of the vehicle undergoing the test.

For testing the fuel consumption of the engine of the vehicle the carburetter thereof is fed from a flowmeter G preferably of the type which gives a instantaneous readings of rate of feed and this flowmeter is in turn supplied from a suitable fuel reservoir $G^1$. Both the reservoir and flowmeter are supported on a pillar $g$ carried by the trolley F. The scale of the flowmeter is usually marked in pints, litres or gallons per hour. The consumption of fuel in miles per gallon is then given by the formula.

$$\frac{\text{Speed in M. P. H.}}{\text{Fuel consumption G. P. H.}}$$

The flow meter is provided with alternative scales marked respectively for 10, 20, 30, 40 and so on M. P. H. which replace or are additional to the basic scale marked in G. P. H. While the vehicle is undergoing test the flow meter scale corresponding with the speed in M. P. H. at which the test is being conducted, is applied to it and the flow meter is then enabled to indicate by direct readings the consumption of fuel in M. P. H.

In order that the engine of the vehicle undergoing test may not become overheated an electrically or mechanically driven fan $G^2$ may be supported by the pillar $g^1$ immediately in front of the radiator 4 of the vehicle. Or an external water circulating system H may be connected to the top and bottom of the radiator, the pipe $h$ of such system connected to the top of the radiator being provided with an adapter $h^1$ of suitable construction to fit into the filling aperture after the cover has been removed therefrom. In some cases both a fan $G^2$ and an external circulating system H may be employed for cooling the engine and both arrangements are illustrated on the one apparatus shown in Fig. 1 but it must be understood that one device can be employed without the other.

So that the position of the trolley F may be adjusted for vehicles of different wheel base it is controlled by a rope $f$ passing over a winch $f^1$ either controlled by hand or by an electric motor as described in the prior U. S. specification No. 1,879,721.

The vehicle is preferably hauled into position on the testing rollers by ropes $f^2$ having hooks $f^3$ on the ends for attachment to the rear axle of the vehicle. The ropes $f^2$ are preferably operated by the winches $f^3$, $f^4$ operated by the same gearing (see Fig. 2) as the winch $f^1$ controlling the rope $f$, a clutch $f^5$ operated by the handle $f^6$ being provided so that either the winch $f^1$ or the winches $f^3$ and $f^4$ can be connected to the drive.

The trolley F is provided with a chock or bar $f^7$ which when the trolley F is moved towards the rear of the apparatus engages the front wheels of the vehicle and pushes the latter off the testing apparatus.

As described in specification No. 1,879,721 ramps L are provided to raise the vehicle to the level of the drums and a platform $L^1$ either fixed or movable as described in the aforesaid specification is arranged between the rear drums and the trolley F over which the front wheels run during the positioning of the vehicle.

What I claim as my invention and desire to protect by Letters Patent is:—

1. Apparatus of the type referred to for testing self-propelled vehicles comprising a bedplate, cradles carried by the bedplate capable of movement substantially concentrically about the axis of the wheels, levers, one of said levers connected to each of the cradles, a weighing device operated by the levers, a drum upon which the driving wheels are mounted carried by the cradles, a dynamometer bolted to one cradle and operated by rotation of the drum and a dial on the weighing device calibrated directly in B. H. P.

2. Apparatus of the type referred to for testing self-propelled vehicles comprising a bedplate, cradles carried by the bedplate capable of movement substantially concentrically about the axis of the wheels, means yieldably resisting movement of the cradles, a drum upon which the driving wheels are mounted carried by the cradles and a dynamometer bolted to one cradle and operated by rotation of the drum.

3. Apparatus as in claim 2 for testing self-propelled vehicles said apparatus having weighing apparatus operated by the movement of the cradles for measuring the power developed by the wheels and weighing apparatus for measuring the power absorbed by the dynamometer.

4. Apparatus for testing self-propelled vehicles comprising a bedplate, cradles carried by the bedplate capable of movement substantially concentrically about the axis of the wheels, arms movably mounted on the bedplate, there being one arm for each cradle, the upper end of said arms being situated on the axis of the wheels to form a fulcrum around which the cradles are free to oscillate, the cradles being pivoted to the lower end of the arms, and a drum upon which the driving wheels are mounted carried by the cradles.

5. Apparatus for testing self-propelled vehicles as in claim 2 said apparatus having an arm carried by the cradles and engaging the axle casing by which any rearward reaction of the tyre is transmitted to the cradles.

GEORGE HENRY WALKER.